United States Patent [19]
Goto et al.

[11] 3,817,031
[45] June 18, 1974

[54] OVERHEAT PROTECTION FOR CATALYST CONVERTER

[75] Inventors: Kenji Goto; Kiyohiko Mizuno, both of Shizuoka, Japan

[73] Assignee: Toyota Jidosha Kogyo Kabushiki Kaisha, Toyota-shi, Aichi-ken, Japan

[22] Filed: Aug. 29, 1972

[21] Appl. No.: 284,605

[30] Foreign Application Priority Data
May 9, 1972  Japan.............................. 47-44994

[52] U.S. Cl..................... 60/288, 23/288 F, 60/294
[51] Int. Cl........................................... F02b 75/10
[58] Field of Search ............. 60/284, 294, 288, 300; 23/288 F

[56] References Cited
UNITED STATES PATENTS

| | | | |
|---|---|---|---|
| 3,090,677 | 5/1963 | Scheitlin | 60/288 |
| 3,188,167 | 6/1965 | Specht | 60/288 |
| 3,189,417 | 6/1965 | Houdry | 60/288 |
| 3,260,566 | 7/1966 | Fisher | 60/288 |
| 3,297,400 | 1/1967 | Eastwood | 60/288 |
| 3,646,764 | 3/1972 | Nakajima | 60/279 |
| 3,662,540 | 5/1972 | Murphey | 60/289 |

*Primary Examiner*—Douglas Hart
*Attorney, Agent, or Firm*—Toren, McGeady & Stanger

[57] ABSTRACT

In an exhaust system of an engine having a catalyst converter in an exhaust pipe, a bypass conduit is connected to the exhaust pipe around the converter. A selector valve is operated in accordance with the engine temperature so that until the engine temperature reaches a certain value, the selector valve acts to inhibit the exhaust gases from flowing through the converter and instead routes the gases only through the bypass conduit. Further, the selector valve can be operated to prevent flow of exhaust gases through the converter when the temperature within the converter rises above a predetermined threshold valve to prevent the catalyst in the converter from being overheated.

3 Claims, 2 Drawing Figures

PATENTED JUN 18 1974    3,817,031

OVERHEAT PROTECTION FOR CATALYST CONVERTER

BACKGROUND OF THE INVENTION

This invention relates to an overheat protection device for a catalyst converter which oxidates or oxidizes the harmful components, such as carbon monoxide and hydrocarbons, contained in the exhaust gases from an automobile engine.

Heretofore, many attempts have been made to prevent the damage and the danger of resulting fire in a vehicle that might be caused when the catalyst temperature in a catalyst converter is raised abnormally, due to some engine problem, such as a misfire.

On the other hand, at the cold start-up of an engine, the choke valve of its carbureter is closed to afford a richer mixture to the engine so that a larger amount of unburned components in the exhaust gases are absorbed in the catalyst. However, in such a case, the oxidating performance of the catalyst is extremely reduced because of the low temperature of the atmospheric air or exhaust gases and it is insufficient to effectuate a satisfactory oxidation reaction of the exhaust gases, with the result that the unburned components adsorbed in the catalyst are accumulated in great quantity in the converter. Thus, when the oxidation reaction by the catalyst, which has adsorbed such large amount of unburned components, is initiated with warm-up of the engine, the catalyst temperature continues to rise until all of the unburned components adsorbed in the catalyst are completely burned away, accordingly, the catalyst can hardly perform its full oxidating function.

SUMMARY OF THE INVENTION

Therefore, the primary object of the present invention is to provide an arrangement in an exhaust system so that large amounts of unburned components discharged from an engine at startup under cold conditions can be prevented from accumulating in the catalyst converter to keep it safe from becoming overheated. According to the present invention, a means is provided which operates in response to the engine temperature for inhibiting the flow of exhaust gas through the catalyst converter until the engine temperature exceeds a certain predetermined level and for preventing flow through the converter when the temperature within the converter rises above a predetermined threshold value.

DESCRIPTION OF THE PREFERRED EMBODIMENT

Figure 1:
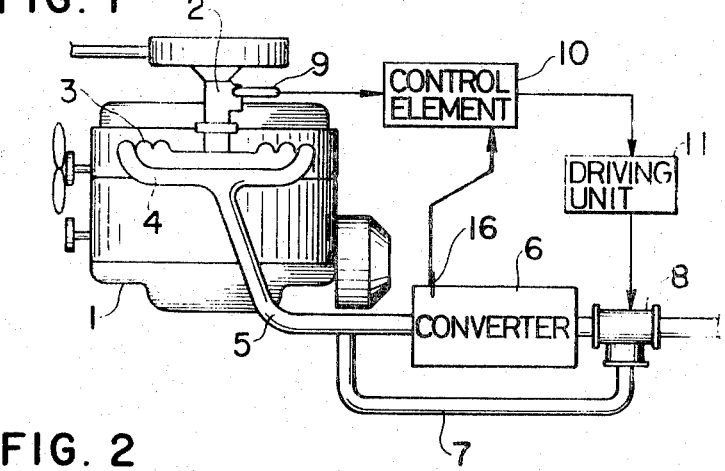
FIG. 1 schematically illustrates an exhaust system of an engine embodying the present invention.

Referring now to FIG. 1, an air-fuel mixture is supplied through a carbureter 2 and an intake manifold 3 to an engine 1, while the exhaust gas is discharged from the engine through an exhaust manifold 4 and an exhaust pipe 5. Located in the exhaust pipe 5 is a converter 6 containing an oxidating catalyst which acts to oxidate or oxidize the unburned components in the exhaust gas. A bypass pipe or conduit 7 is connected to the exhaust pipe 5 about the catalyst converter 6 for bypassing the converter. At the downstream junction of the bypass pipe 7 and the exhaust pipe 5, that is downstream from the converter 6, is a selector valve 8 for selectively regulating the flow of the exhaust gases either through the converter 6 or through the bypass pipe 7. Secured to the automatic choke portion of the carbureter 2 is a thermo-sensor 9 for detecting the engine temperature. An output signal issued from the thermosensor 9 is transmitted to a control element 10 which energizes a selector valve driving unit 11.

Figure 2:
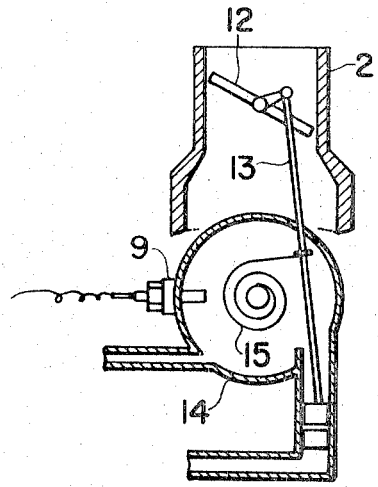
FIG. 2 shows a temperature sensing mechanism used in the system of FIG. 1.

As shown in FIG. 2, a choke valve 12 in the carbureter 2 is connected to a bimetallic element 15 in a casing 14 by a link 13. The choke valve 12 is mechanically operated corresponding to the engine temperature in a manner well known in the art. When the temperature in the casing 14, which is maintained at the same temperature as the engine, is low, the bimetallic element 15 remains contracted to keep the choke valve 12 closed. However, when a higher temperature is reached, the bimetallic element 15 expands to open the choke valve 12 through the link 13. Secured to and extending into the casing 14 is a thermo-sensor 9 which operates in response to the temperature in the casing corresponding to the engine temperature for issuing a signal corresponding to the opening of the choke valve 12.

The exhaust system arrangement described above, in accordance with the present invention, operates so that when the engine 1 is in a warmed-up or hot state, no signal is issued from the control element 10 and the selector valve 8 keeps the exhaust bypass pipe 7 closed, allowing the exhaust gases to flow only through the catalyst converter 6, and hence the oxidation of exhaust gases is performed by the catalyst in the converter in the normal manner. On the other hand, during cold start-up of the engine 1, the choke valve 12 is kept closed and the thermo-sensor 9 issues an output signal corresponding to the low engine temperature at that time. This signal is transmitted to the control element 10 which, thereupon, produces an output to energize the driving unit 11 and, in turn, actuates the selector valve 8 for causing the exhaust gases to flow only through the bypass pipe 7 and not through the catalyst converter 6. Therefore, during this time, no oxidation of exhaust gases takes place in the catalyst converter 6 and, hence, there is no chance for the unburned components to become adsorbed and accumulated on the catalyst, since under low temperature conditions the oxidation effectiveness of the catalyst is low. When the engine 1 is sufficiently warmed up and the choke valve 12 is opened, the control element 10 no longer issues any output signal and the selector valve 8 returns to its original position, allowing the exhaust gases to flow only through the catalyst converter 6.

The thermo-sensor 9 may be replaced with a switch arranged to be operated in response to deformation of the bimetallic element 15. The selector valve 8 may be provided at the upstream junction of the bypass pipe 7 with the exhaust pipe 5 ahead of the converter 6. Further, for discontinuing the flow of exhaust gases through the catalyst converter 6 when the temperature in the converter rises above a predetermined threshold value, a thermo-sensor 16 is attached to the converter 6 and is connected to the input of the control element 10 in a manner well known in the art.

What is claimed is:

1. In an engine having an exhaust gas discharging system including an exhaust pipe, the invention comprising a catalyst converter located in said exhaust pipe, means forming a bypass conduit connected to said exhaust pipe upstream and downstream of said catalyst converter, a selector valve located at one of the junctions of said exhaust pipe and said bypass conduit for selectively controlling the flow of exhaust gases through said converter and said bypass conduit, thermo-sensing means for detecting the temperature of the engine, means associated with said thermo-sensing means for operating said selector valve so that when the engine is warming up said selector valve directs the exhaust gases for flow through the bypass conduit, the engine includes a carburetor with an automatic choke, and means for coordinating the operation of said automatic choke and said selector valve, said coordinating means comprises a casing connected to the engine for maintaining it at substantially the same temperature as the engine, a bimetallic element positioned within said casing, a link connected to said bimetallic element and to said automatic choke for opening said automatic choke as the temperature rises, and said thermo-sensing means being mounted in said casing and exposed to the temperature conditions therein.

2. In an engine, as set forth in claim 1, wherein a second thermo-sensing means is associated with said catalyst converter and with said means for operating said selector valve for also regulating flow through said selector valve based on the temperature within said catalyst converter.

3. In an engine, as set forth in claim 2, wherein said means for operating said selector valve comprises a control element arranged to receive signals from said thermo-sensing means mounted in said casing and said second thermo-sensing means associated with said catalyst converter, and a selector valve driving unit arranged to be energized by said control element for operating said selector valve.

* * * * *